United States Patent Office 3,173,957
Patented Mar. 16, 1965

3,173,957
PROCESS FOR THE PREPARATION OF ACROLEIN
Edgar L. McDaniel and Howard S. Young, Kingsport, Tenn., assignors to Eastman Kodak Company, Rochester, N.Y., a corporation of New Jersey
No Drawing. Filed Aug. 21, 1961, Ser. No. 132,556
5 Claims. (Cl. 260—604)

This invention relates to an improved process for the oxidation of an olefin. More particularly, this invention relates to the preparation of an unsaturated aldehyde by the catalytic oxidation of an α-monoolefin. In a specific aspect, this invention relates to the high temperature, vapor phase, oxidation of propylene to form acrolein in the presence of a catalyst containing bismuth, a rare earth element and molybdenum.

Acrolein is a well known compound which, because of its unique properties, has a variety of very valuable uses. For example, acrolein is used in the preparation of war gases, resins, glycerin, polyurethane, polyester resins, methionine and pharmaceuticals. Numerous catalytic processes have been suggested for the preparation of this very valuable compound including the catalytic oxidation of propylene at elevated temperatures in the presence of solid, metal containing catalysts. However, but for a few noteworthy exceptions, prior art workers have been unable to provide this type of process employing a catalyst that is highly active and selective for the conversion of propylene to acrolein under the conditions of reaction, the activity of which remains high over long periods of time, is easily regenerated in the event such becomes desirable, possesses a high degree of thermal stability and is not deleteriously effected by the presence of saturated hydrocarbons in the feed stream with propylene. It is evident that a novel process for the oxidation of propylene to acrolein employing a catalyst fulfilling all of the aforementioned requirements will greatly enhance the art.

Accordingly, it is an object of this invention to provide a novel process for the preparation of acrolein.

Another object of this invention is to provide a novel process for the preparation of acrolein which process employs a catalyst capable of meeting the requirements enumerated hereinbefore.

Another object of this invention is to provide a novel process for the continuous, high temperature, vapor phase catalytic oxidation of propylene.

Still another object of this invention is to provide an improved catalytic oxidation process using a solid, metal containing catalyst that has not been previously employed in the oxidation of α-olefins.

A still further object of this invention is to provide an improved catalytic process for the controlled, incomplete oxidation of propylene.

Other objects and advantages of the present invention will become apparent from an examination of the following specification and claims.

In copending application Serial No. 83,916, filed January 23, 1961, there is disclosed a process for the preparation of aliphatic nitriles at elevated temperatures by reacting an olefin with ammonia and oxygen in the presence of a novel catalyst comprising bismuth oxide and a heteropoly acid. The heteropoly acids employs as one component of the catalysts in the aforementioned process can be prepared from the ammonium salt of the acid. This salt is more easily prepared than the free acid and decomposes, at least in part, to the free acid under the high temperatures used in the formation of the catalyst. It is not known whether the conversion to free heteropoly acid is quantitative and, therefore, catalysts containing residual ammonium salt are contemplated as being within the scope of the invention disclosed and claimed. The heteropoly acids employed in the process disclosed in copending application Serial No. 83,916, include, for example, dodecamolybdoceric acid, which can be represented by the formula:

$$H_8[Ce(Mo_2O_7)_6]$$

Although cerium is the preferred central atom in these acids, this element can be substituted by other rare earth elements of the cerium group including, for example, lanthanum, praseodymium, neodymium, samarium and the like, as well as other rare earth elements of the yttria group such as gadolinium and the like or mixtures thereof. In addition, the coordinating element, molybdenum, can be replaced by other elements of the Periodic Table including those from the vanadium and chromium families of elements, as exemplified by vanadium, niobium, tantalum, chromium, tungsten, uranium and the like. In addition, more than one of these elements can serve as coordinating elements and, when more than one element serves as the coordinating elements, molybdenum can, of course, be included.

The heteropolyacids or their ammonium salts used in the preparation of the catalysts are well known as indicated above, and can be prepared by any of the conventional procedures employed in the art for this purpose. For example, a convenient method for preparing ammonium dodecamolybdocerate involves heating a solution of 600 g. of ammonium heptamolybdate tetrahydrate in 2000 ml. of water at the boiling point. Over a period of 30 minutes a solution of 100 g. of ceric ammonium nitrate in 1000 ml. of water is added dropwise to the boiling solution with vigorous stirring. A canary-yellow, crystalline precipitate forms as the cerium solution is added and after addition is complete, the precipitate and solution are allowed to cool for about 15 hours. The precipitate is then slurried with the supernatant liquid, allowed to settle for about 2 minutes, and the turbid fluid decanted. The yellow crystalline precipitate is washed by decantation with 500 ml. of water three times. The ammonium dodecamolybdocerate precipitate is collected on a suitable funnel with suction and the yellow crystals spread out in a thin layer to air dry. Ammonium dodecamolybdocerate, as well as ammonium salts of the other heteropolyacids disclosed herein, can be prepared in this manner and used as one component of the catalyst.

Bismuth oxide is employed as the other component of the catalyst in the aforementioned process. This metal oxide is admixed with the heteropoly acid and the resulting mixture is then calcined at elevated temperatures, for example 450–600° C. for several hours or more. In practice, bismuth oxide per se or other bismuth derivatives which decompose, at least in part, to form bismuth oxide in the calcination procedure can be employed. Like the ammonium salt of the heteropoly acid, it is not known whether the conversion is quantitative and, therefore, the presence of unreacted bismuth salt is contemplated within the scope of the invention. Thus, bismuth compounds that can be employed in the preparation of the catalyst include bismuth oxide, bismuth subcarbonate, bismuth hydroxide, bismuth subnitrate, bismuth oxalate, bismuth tetraoxide, bismuth pentoxide and bismuth oxysulfate. Bismuth metal, since it oxidizes, at least in part, to form bismuth oxide during calcination, can also be used in the preparation of the catalyst. The concentrations of the bismuth component and heteropoly acid component in the catalyst can vary from about 3 to about 75%, by weight, and more preferably from 10 to about 50%, by weight, based on the mixture.

In accordance with this invention, it has been found that the novel catalysts disclosed in copending application Serial No. 83,916, filed January 23, 1961, are extremely effective catalysts for the oxidation of propylene to form acrolein. These catalysts are highly active and selective for the conversion of propylene to acrolein, retain a high activity over long periods of time, are thermally stable, and can be readily regenerated by treatment at elevated temperatures with a gas containing molecular oxygen. Furthermore, the catalyst has the added advantage in that it fluidizes well and thus is readily adaptable for use in the fluidized state and, over long periods of use in this state, erosion of the catalyst remains at a minimum. In addition, this catalyst has the further advantage in that it is not deleteriously effected by the presence of saturated hydrocarbons in a feed stream with propylene as are many oxidation catalysts. Accordingly, the readily available feed streams of propylene containing appreciable concentrations of propane can be employed in the process of this invention without any marked deleterious effect in conversion or yield. Still another advantage incurred in using the aforementioned catalyst in the process of this invention is that there is no significant formation of formaldehyde. In many prior art high temperature hydrocarbon oxidation processes considerable quantities of formaldehyde are obtained as a by-product.

A very surprising and significant feature of this invention is that either component of the catalyst alone is ineffective as an oxidation catalyst for converting propylene to acrolein, as shown by Examples 9–12 which follow. However, when these two components are combined, there results a very effective oxidation catalyst.

The reaction involved in the process of this invention can be represented by the following equation:

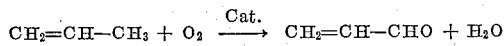

$$CH_2=CH-CH_3 + O_2 \xrightarrow{Cat.} CH_2=CH-CHO + H_2O$$

As already indicated, the catalysts employed in the process of this invention are disclosed in copending application Serial No. 83,916, filed January 23, 1961, and as well as being described hereinbefore. The theoretical mole ratio of propylene to oxygen for the reaction involved in the process of this invention is 1:1. In practice, it is preferred to use ratios near these values. However, propylene to oxygen ratios of from 1:0.05 to about 1:10 are operative. Water can also be fed to the reactor or it can be omitted. When used, water acts as a diluent and can be employed in amounts ranging from about 0.05 to about 2 moles per mole of propylene in the feed. Nitrogen is not detrimental to the reaction and, therefore, the oxidizing agent employed in the process of the invention can be air. If air is used, the ratio of oxygen to nitrogen should be approximately 1:4.

The temperatures employed in the process of this invention can be varied within wide limits, including temperatures from about 300° to about 600° C., with temperatures in the range of 350° to about 500° C. being preferred. The reaction is not significantly pressure dependent and, therefore, the process of this invention can be carried out satisfactorily at atmospheric pressure, which condition is preferred. However, sub-atmospheric or super-atmospheric pressures can also be used and give generally good results.

The gaseous hourly space velocity (GHSV) can also be varied over a wide range, for example, values (S.T.P.) as low as 100 can be used, as well as values as high as 6000. It is preferred that space velocities in the range of about 300 to 1000 be employed. The gaseous hourly space velocity (GHVS) is defined as the number of volumes of feed gases (S.T.P.) which pass through one volume of catalyst bed in one hour.

The catalyst is capable of use either in a fixed bed or a fluidized state. The latter method is particularly advantageous since it permits extreme ease of temperature control in highly exothermic reactions of the type involved in the present invention. In contrast, temperature control in a fixed bed is very difficult. The oxygen employed in the process can be fed in elemental form, as air, or in admixture with diluents, for example, carbon dioxide, water, or with inert gases such as nitrogen, argon and the like.

The catalyst can be employed in the process of this invention without being supported on an inert carrier. However, the use of a carrier has been found to be advantageous in the practice of this invention and it is preferred that such be used. Carriers that can be used to support the catalyst include any one or mixtures of the conventional carriers known in the art, for example, silica, pumice, kieselguhr, titania, alumina, magnesia, silica-alumina, magnesium oxide, zirconia, thoria, clays, and silica gel.

In practicing the invention, any of the conventional types of apparatus suitable for carrying out the reaction in the vapor phase can be employed, including, for example, a tubular type of reactor or furnace that can be operated in continuous or intermittent manner and which is equipped to contain the catalyst in intimate contact with the entering feed gas. As already indicated, the use of a reactor containing a catalyst "fluidized-bed" is preferred since the temperature of the reaction can be closely controlled with ease. The reacted gases are conducted to suitable cooling and separatory equipment and the products further separated and recovered by any of the conventional methods known to those skilled in the art. One such recovery method involves contacting the effluent gases from the reactor with cooled water or an appropriate solvent to remove the products of the reaction. In such case, the ultimate acrolein product can be separated by conventional means such as distillation of the resulting liquid mixtures. Unreacted propylene can be recovered and recirculated through the system. Spent catalyst can be reactivated by heating in contact with air under the conditions generally employed in the reaction.

The excellent results obtained by the preparation of acrolein from propylene according to this invention is readily appreciated from an examination of the examples which follow. The apparatus employed in carrying out the runs described in these examples is a "fluidized-bed" reactor. The reactor is constructed of Vycor glass and is cylindrical with a conical bottom. The internal diameter of the lower portion is 40 mm. for 25 cm. of height and the upper portion of the reactor is 55 mm. in diameter. The feed gases are introduced into the bottom of the reactor serving to fluidize the catalyst. Thus, the reaction is carried out using a "fluidized-bed." The reactor is heated electrically.

The effluent gases and vapors from the reactor are introduced into traps cooled with a Dry Ice bath. The condensate consists almost entirely of acrolein and water. The noncondensable gases are led from the traps through a gas sampling valve and then through a test meter. At intervals the gas stream is sampled and the cold traps are removed from the bath, thawed, and the condensate diluted with water. The traps are washed out with water, and the total aqueous solution analyzed. The gas samples are generally about 80% nitrogen with propylene, oxygen, carbon dioxide and carbon monoxide accounting for almost all of the rest of the gas composition. This technique is expedient for the purpose of illustrating the invention. However, other suitable methods that are well known to those skilled in the art can be used with equal success. The definitions used in the examples are as follows:

Contact time is the average time which the reactants spend at reaction conditions in a volume equal to that of the catalyst bed.

The production rate of acrolein over the catalyst is an important measure of its effectiveness, and is the space-time yield, which is the number of grams of acrolein produced per liter of catalyst per hour of use (abbreviated g./l.-hour).

The percent conversion of propylene to acrolein=

$$\frac{\text{moles of acrolein formed}}{\text{moles of propylene fed}} \times 100$$

The percent yield of acrolein=

$$\frac{\text{moles of acrolein formed}}{\text{moles of propylene consumed}} \times 100$$

This invention can be further illustrated by the following examples of preferred embodiments thereof although it will be understood that these examples are included merely for purposes of illustration and are not intended to limit the scope of the invention unless otherwise specifically indicated:

Example 1

As already indicated, acrolein can be prepared by the oxidation of propylene at high temperature in the presence of a catalyst comprising bismuth oxide and heteropoly acid, for example, dodecamolybdoceric acid, which catalyst is supported on an inert carrier. To illustrate, 400 g. of an aqueous silica sol which is 30% silicon dioxide is placed in a beaker equipped with a power stirrer and situated on an electric hot plate. 151 g. of ammonium dodecamolybdocerate crystals are pulverized with a porcelain mortar and pestle. The powdered ammonium dodecamolybdocerate is slowly added to the vigorously stirred silica sol resulting in a canary yellow slurry. The stirred slurry is heated to the boiling point, and a solution of 308 g. of bismuth nitrate in 200 ml. of dilute aqueous nitric acid is added slowly to the stirred hot sol. After additional heating and stirring the mixture thickens, and is transferred to an evaporating dish and dried in an oven at 130° C. The resulting product is calcined 4 hours at 500° C. in a muffle furnace.

The catalyst is pulverized, sieved and 146 ml. of 40–140 mesh material is charged to the reactor described above. A feed gas stream comprising 164 ml. of propylene, 917 ml. of air and 639 ml. of water vapor per minute (S.T.P.) is fed to the reactor. The reaction temperature is 425° C. and the feed rate corresponds to a two second contact time. Over a period of 60 minutes' operation at these conditions, 7.34 g. of acrolein is recovered, corresponding to a conversion of 29.8%, a yield of 55.0%, and a space-time yield of 50.2 g./1-hr.

Example 2

A feed stream comprising 101 ml. of propylene, 665 ml. of air and 403 ml. of water vapor per minute (S.T.P.) is charged to the above reactor containing a catalyst comprising 37% bismuth oxide and 33% dodecamolybdoceric acid supported on silica at a temperature of 450° C. The feed rate is equivalent to a three second contact time. Over one hour of operation 4.94 g. of acrolein is recovered, corresponding to a conversion to acrolein of 32.6%, a yield of 56.4%, and a space-time yield of 33.8 g./l.-hr.

Example 3

150 g. of the catalyst of Example 1 is placed in the above-described "fluidized-bed" reactor. During the reaction, the reactor is maintained at a temperature of 449° C. A feed stream of 302 ml. of propylene, 1788 ml. of air and 1200 ml. of water vapor per minute (S.T.P.) are charged to the reactor. The contact time is one second and after one hour's operation, a total of 9.12 g. of acrolein is recovered, corresponding to a conversion of 20.1%, yield of 41.9% and a space-time yield of 62.4 g./l.-hour.

Example 4

150 g. of the catalyst of Example 1 is placed in the above-described "fluidized-bed" reactor which is then charged with a feed stream comprising 117 ml. of propylene, 643 ml. of air and 478 ml. of water vapor per minute (S.T.P.). During the reaction the reactor is maintained at a temperature of 408° C. and the contact time is 3 seconds. After one hour of operation 4.14 g. of acrolein is obtained, corresponding to a conversion of 23.6%, a yield of 45.3% and a space-time yield of 28.3%.

Example 5

150 g. of catalyst comprising 37% bismuth oxide and 33% dodecamolybdoceric acid on silica is placed in the above-described "fluidized-bed" reactor which is then charged with a feed stream of 107 ml. of propylene, 692 ml. of air, and 427 ml. of water vapor per minute (S.T.P.). During the reaction, the temperature is maintained at 410° C. and the contact time is 3 seconds. After one hour of operation 6.72 g. of acrolein is obtained, corresponding to a conversion to acrolein of 41.8%, a yield of 71.1% and a space-time yield with 46 g./l.-hour.

Example 6

150 g. of the catalyst prepared according to Example 1 is placed in the above-described "fluidized-bed" reactor which is then charged with a feed stream of 331 ml. of propylene, 1654 ml. of air, 1325 ml. of water vapor per minute (S.T.P.). During the reaction the temperature is maintained at 450° C. and the contact time is 1 second. Over a period of one hour at these conditions 10.3 g. of acrolein is obtained, corresponding to a conversion of 20.7%, a yield of 46.1% and a space-time yield of 70.5 g./l.-hr.

Example 7

Another catalyst comprising bismuth oxide and dodecamolybdoceric acid supported on silica is prepared according to the procedure set forth in Example 1. A 150 g. charge of 40–140 mesh catalyst is placed in the "fluidized-bed" reactor described above which is then charged with a stream of 152 ml. of propylene, 852 ml. of air, and 575 ml. of water vapor per minute (S.T.P.). The temperature of the reactor during the reaction is maintained at 435° C. and the contact time is 2.1 seconds. Over a period of operation of 80 minutes, 8.96 g. of acrolein is obtained, corresponding to a conversion of 29.4%, a yield of 52.3% and a space-time yield of 44.8 g./l.-hr.

Example 8

It has already been pointed out that water can be absent from the feed stream employed in the process of this invention. To illustrate, 200 g. of catalyst prepared as in Example 1, is charged to the above-described "fluidized-bed" reactor. A feed stream of 267 ml. of propylene and 1332 ml. of air per minute (S.T.P.) is fed to the reactor. During the reaction the temperature of the reactor is maintained at 483° C. and the contact time is 2.7 seconds. After 30 minutes, 2.85 g. of acrolein is obtained, corresponding to a 14.2% conversion and a 30% yield.

Example 9

As pointed out hereinbefore, neither component of the catalyst is effective in the process of this invention when used in the absence of the other component, as shown by this example and the three that follow. Thus, a composition comprising 30% bismuth oxide on silica is prepared by adding a solution of bismuth nitrate in dilute aqueous nitric acid to an aqueous silica sol containing 30% silica. The composition is heated and stirred until it thickens and it is then dried in an oven at 140° C. After drying, it is calcined in a muffle furnace for 6 hours. The resulting catalyst is crushed, sieved and 150 cc. (40–120 mesh) is charged to the reactor described above. A feed gas stream comprising 166 ml. propylene, 912 ml. of air and 664 ml. of water vapor per minute (S.T.P.) is fed to the reactor. The reaction temperature is 443° C. and at the contact time of 2 seconds. No acrolein is formed over 30 minutes of operation.

Example 10

In the absence of water in the feed stream the results are substantially the same. Thus, using the same catalyst and procedure as Example 9 a feed gas stream comprising 200 ml. of propylene, and 1100 ml. of air per minute (S.T.P.) is fed to the reactor. The reaction temperature is 457° C. and the contact time is 2.6 seconds. After 30 minutes of operation only 0.09 g. of acrolein is recovered, corresponding to a conversion of only 0.6%.

Example 11

A composition comprising 33%, by weight, dodecamolybdoceric acid on silica is prepared according to the procedure of Example 1. Using the same feed gas stream and procedure of Example 9, only 0.5 g. of acrolein is recovered, corresponding to a conversion of only 0.7%.

Example 12

The catalyst of Example 11 is used in the procedure of Example 10. Only 0.24 g. of acrolein is recovered, corresponding to a conversion of only 0.9%.

From an examination of Examples 9-12, it is evident that the two components described hereinabove are necessary to form an effective catalyst in the process of this invention; either component separately being ineffective for this same purpose.

Thus, by the practice of this invention there is provided a novel process for the preparation of acrolein from propylene employing catalysts that are highly active and selective in the process under the conditions employed. In addition, these catalysts can also be used in other oxidation reactions. For example, the conversion of isobutylene to methacrolein, butene-1 or butene-2 to crotonaldehyde and methyl vinyl ketone and pentene to ethyl vinyl ketone and 2-pentenal.

This application is a continuation-in-part of copending application Serial No. 83,916, filed January 23, 1961.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. The method for preparing acrolein which comprises oxidizing propylene with oxygen at a temperature in the range of about 300° to about 600° C., in the presence of a catalyst consisting essentially of bismuth oxide and an acid compound having the formula:

$$H_8[X(Mo_2O_7)_6]$$

where X is a rare earth element, said bismuth and acid compounds each being present in the catalyst in an amount of about 3 to about 75%, by weight.

2. The method according to claim 1 wherein X is cerium.

3. The method according to claim 1 wherein the temperature is in the range of about 350° to about 500° C.

4. The method according to claim 1 wherein propylene is oxidized with air.

5. The method for preparing acrolein which comprises oxidizing propylene with oxygen at a mole ratio of propylene to oxygen in the range of about 1:0.05 to about 1:10, at a temperature in the range of about 350° to about 500° C., in the presence of a silica supported mixture of 37%, by weight, of bismuth oxide and 33%, by weight, of dodecamolybdoceric acid, as catalyst.

References Cited in the file of this patent
UNITED STATES PATENTS 2,941,007     Callahan et al. _____ June 14, 1960

FOREIGN PATENTS 839,808     Great Britain _____ June 29, 1960